US009085342B2

(12) United States Patent  (10) Patent No.: US 9,085,342 B2
Jauvtis  (45) Date of Patent: Jul. 21, 2015

(54) POWER ASSISTED VEHICLE

(71) Applicant: Nathan Jauvtis, San Francisco, CA (US)

(72) Inventor: Nathan Jauvtis, San Francisco, CA (US)

(73) Assignee: Dr. Nathan Jauvtis Engineering, San Francisco, CA (US)

( * ) Notice: Subject to any disclaimer, the term of this patent is extended or adjusted under 35 U.S.C. 154(b) by 0 days.

(21) Appl. No.: 13/784,740

(22) Filed: Mar. 4, 2013

(65) Prior Publication Data

US 2013/0233631 A1 Sep. 12, 2013

Related U.S. Application Data

(60) Provisional application No. 61/606,373, filed on Mar. 3, 2012.

(51) Int. Cl.
B62M 6/40 (2010.01)
B62M 6/55 (2010.01)
B60K 1/04 (2006.01)
B62M 6/60 (2010.01)
B62M 6/90 (2010.01)

(52) U.S. Cl.
CPC .. *B62M 6/55* (2013.01); *B60K 1/04* (2013.01); *B62M 6/60* (2013.01); *B62M 6/90* (2013.01)

(58) Field of Classification Search
CPC ............. B62M 6/60; B62M 6/40; B62M 6/70
USPC ............ 180/205.1, 206.1, 206.4, 206.7, 68.5; 297/452.13, 452.15, 452.22, 452.56; 429/96–100, 159
See application file for complete search history.

(56) References Cited

U.S. PATENT DOCUMENTS

| | | | | |
|---|---|---|---|---|
| 2,457,430 A | * | 12/1948 | Argyris | 180/206.7 |
| 3,921,745 A | * | 11/1975 | McCulloch et al. | 180/206.1 |
| 3,991,843 A | * | 11/1976 | Davidson | 180/206.1 |
| 4,044,852 A | * | 8/1977 | Lewis et al. | 180/206.4 |
| 4,085,814 A | * | 4/1978 | Davidson et al. | 180/206.7 |
| 4,280,581 A | * | 7/1981 | Rudwick | 180/206.5 |
| 4,541,500 A | * | 9/1985 | Gelhard | 180/205.2 |

(Continued)

FOREIGN PATENT DOCUMENTS

| | | |
|---|---|---|
| JP | 2011/068278 | 9/2009 |
| WO | WO 2013/134164 | 3/2012 |

OTHER PUBLICATIONS

International search report for WO 2013/134164 Cumulative of PCT/US2013/028949, Mar. 3, 2012.

*Primary Examiner* — Joseph Rocca
*Assistant Examiner* — Gabriela C Craciun
(74) *Attorney, Agent, or Firm* — Sunil Singh; Syndicated Law P.C.

(57) ABSTRACT

Provided herein is a power assisted motorized vehicle which can be operated in a manual mode or a motorized mode or in a combination of manual and motorized modes. The vehicle includes, inter alia, a frame connected to at least one fork capable of supporting a wheel having a first driven sprocket assembly and a second driven sprocket assembly, a rechargeable electrical power supply attached to the frame, a motor controller attached to the frame, an electric motor supported by the frame and attached to a first driving sprocket which is coupled to the first driven sprocket assembly and a manual pedal assembly supported by the frame and comprising a pedal crank shaft with two pedals and a second driving sprocket which is coupled to the second driven sprocket assembly.

19 Claims, 12 Drawing Sheets

(56) References Cited

U.S. PATENT DOCUMENTS

| | | | |
|---|---|---|---|
| 5,474,148 A * | 12/1995 | Takata | 180/206.2 |
| 5,560,266 A * | 10/1996 | Shikimori et al. | 74/594.1 |
| 5,755,304 A * | 5/1998 | Trigg et al. | 180/65.51 |
| 5,901,807 A * | 5/1999 | Tseng | 180/206.3 |
| 5,909,781 A * | 6/1999 | Yonekawa et al. | 180/206.4 |
| 5,924,511 A * | 7/1999 | Takata | 180/206.2 |
| 5,934,401 A * | 8/1999 | Mayer et al. | 180/220 |
| 6,062,329 A * | 5/2000 | Chai | 180/206.5 |
| 6,148,944 A * | 11/2000 | Adomi et al. | 180/220 |
| 6,152,251 A * | 11/2000 | Nagai et al. | 180/220 |
| 6,196,347 B1 * | 3/2001 | Chao et al. | 180/206.2 |
| 6,276,479 B1 * | 8/2001 | Suzuki et al. | 180/206.8 |
| 6,290,014 B1 * | 9/2001 | MacCready, Jr. | 180/205.1 |
| 6,423,443 B1 * | 7/2002 | Tsuboi et al. | 429/98 |
| 6,453,766 B1 | 9/2002 | Ose | |
| 6,591,929 B1 * | 7/2003 | Tsuboi et al. | 180/206.4 |
| 6,629,574 B2 * | 10/2003 | Turner | 180/206.4 |
| 6,976,551 B2 * | 12/2005 | Spanski | 180/206.2 |
| 7,108,097 B1 * | 9/2006 | Bolton et al. | 180/206.7 |
| 7,261,175 B1 * | 8/2007 | Fahrner | 180/206.4 |
| 7,284,631 B2 * | 10/2007 | Rizzetto | 180/206.4 |
| 7,547,021 B2 * | 6/2009 | Bon | 280/11.115 |
| 7,568,714 B2 * | 8/2009 | Sasnowski et al. | 280/205 |
| 8,100,424 B2 * | 1/2012 | Jan | 280/212 |
| 8,616,321 B2 * | 12/2013 | Aoki et al. | 180/206.1 |
| 8,640,805 B2 * | 2/2014 | Kuroki | 180/206.1 |
| 2003/0213630 A1 | 11/2003 | Pyntikov et al. | |
| 2004/0058231 A1 * | 3/2004 | Takeshita et al. | 429/123 |
| 2004/0231905 A1 * | 11/2004 | Kurita et al. | 180/205 |
| 2005/0039963 A1 * | 2/2005 | Forderhase | 180/205 |
| 2005/0087379 A1 * | 4/2005 | Holland | 180/205 |
| 2005/0189157 A1 * | 9/2005 | Hays et al. | 180/207 |
| 2006/0201728 A1 * | 9/2006 | Wu | 180/205 |
| 2008/0066984 A1 * | 3/2008 | Holland | 180/207 |
| 2009/0261134 A1 * | 10/2009 | Tetsuka et al. | 224/412 |
| 2010/0206652 A1 * | 8/2010 | Kielland | 180/220 |
| 2011/0042156 A1 | 2/2011 | Vincenz | |
| 2011/0168471 A1 * | 7/2011 | Duignan | 180/205.7 |
| 2011/0168472 A1 * | 7/2011 | Li et al. | 180/206.4 |
| 2011/0240391 A1 * | 10/2011 | Bonneville | 180/220 |
| 2011/0247888 A1 * | 10/2011 | Kohlbrenner | 180/206.7 |
| 2011/0272203 A1 * | 11/2011 | Sugimoto et al. | 180/206.1 |
| 2012/0145469 A1 * | 6/2012 | Tong | 180/206.1 |
| 2013/0068549 A1 * | 3/2013 | Laprade | 180/206.1 |
| 2013/0092464 A1 * | 4/2013 | Gu et al. | 180/206.4 |
| 2013/0285410 A1 * | 10/2013 | Auerbach et al. | 296/178 |

* cited by examiner

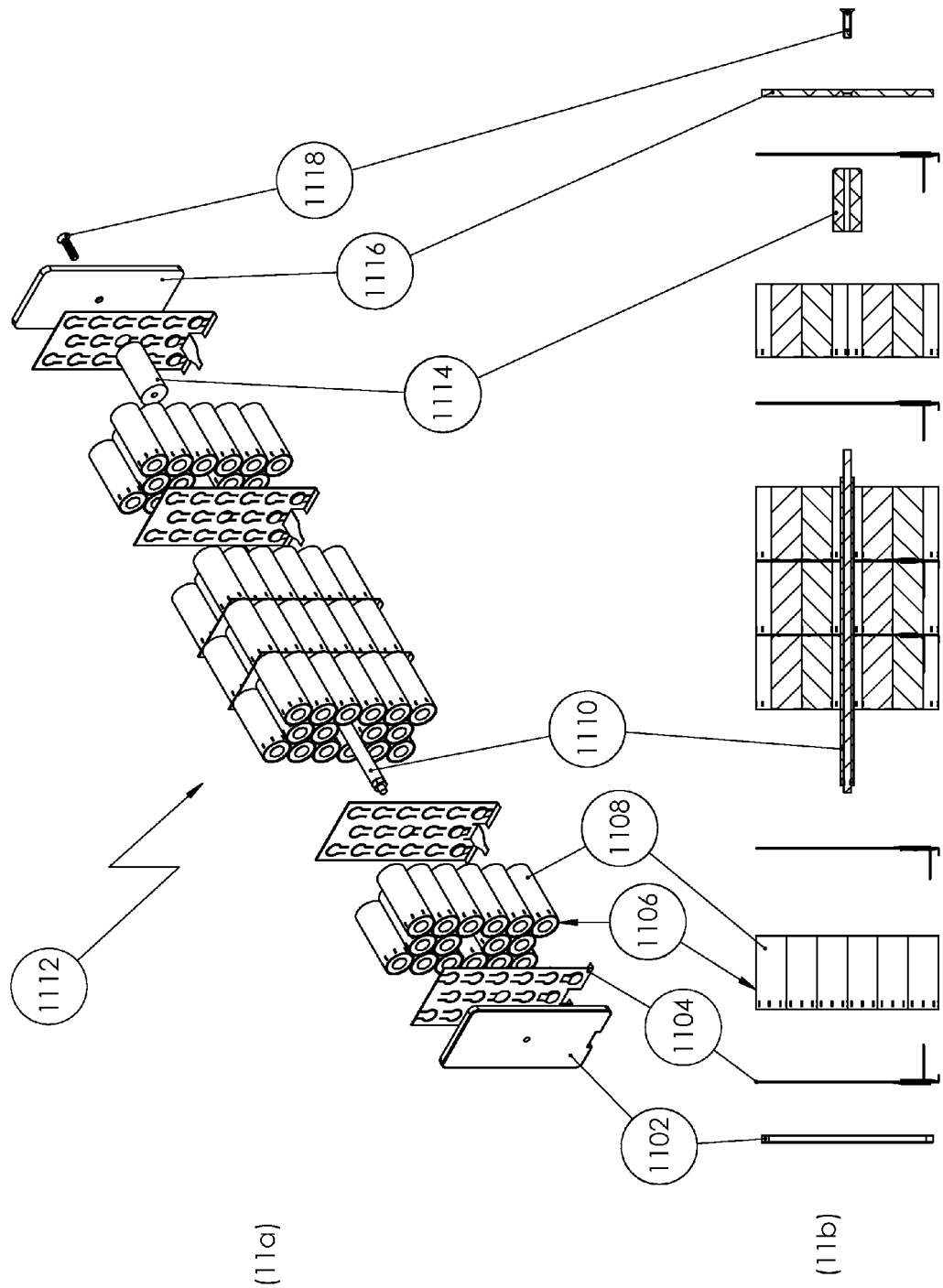

POWER ASSISTED VEHICLE

This application claims priority under 35 U.S.C. §119(e) from U.S. Provisional Application Ser. No. 61/606,373, filed on Mar. 3, 2012, which is hereby incorporated by reference in its entirety.

FIELD

Provided herein is a power assisted motorized vehicle which can be operated in a manual mode or a motorized mode or in a combination of manual and motorized modes. The vehicle includes, inter alia, a frame connected to at least one fork capable of supporting a wheel having a first driven sprocket assembly and a second driven sprocket assembly, a rechargeable electrical power supply attached to the frame, a motor controller attached to the frame, an electric motor supported by the frame and attached to a first driving sprocket which is coupled to the first driven sprocket assembly and a manual pedal assembly supported by the frame and comprising a pedal crank shaft with two pedals and a second driving sprocket which is coupled to the second driven sprocket assembly.

BACKGROUND

Electrically assisted motorized cycles which can be operated in a manual mode or in a motorized mode or in a combination of manual and motorized modes have been previously described in the past. However, problems associated with integration of pedal location with electrical motor placement, cycle stability during operation, sufficient power, battery charging and battery removal have prevented widespread use of these environmentally acceptable vehicles.

Accordingly, what is needed is an electrically assisted motorized cycle which can be operated as described, supra, in an environmentally acceptable mode, smoothly integrates pedal location with motor placement, is dynamically stable when operational and has substantial power output with simple and efficient battery charging and battery removal.

SUMMARY

The present invention satisfies these and other needs by providing a novel power assisted vehicle. Also provided are a novel battery saddle, a novel electronic cable assembly, a novel throttle assembly, a novel motor mount assembly, a novel battery assembly, and a novel battery quick release assembly.

In one aspect, a power assisted vehicle is provided which includes a frame connected to at least one fork capable of supporting a wheel having a first driven sprocket assembly and a second driven sprocket assembly, a rechargeable electrical power supply attached to the frame, a motor controller attached to the frame, an electric motor supported by the frame and attached to a first driving sprocket which is coupled to the first driven sprocket assembly, a manual pedal assembly supported by the frame and comprising a pedal crank shaft with two pedals and a second driving sprocket which is coupled to the second driven sprocket assembly, where the motor is bi-directionally coupled to the wheel, and the pedal assembly is uni-directionally coupled to the wheel and where the location of the electric motor intersects or is tangent to the space defined by rotation of the pedal assembly and where the power supply is electrically connected to the motor controller.

In some embodiments, a power assisted vehicle is provided which includes a frame connected to a front fork and a rear fork supporting a front wheel and a rear wheel, a throttle assembly attached to the front fork, a crossbar connected to the front fork, a seat supported by the crossbar and frame, a rechargeable electrical power supply attached to the crossbar, a motor controller attached to the crossbar, a motor mount attached to the frame, a center stand attached to the motor mount, an electric motor attached to the motor mount and having a first driving sprocket coupled to a first driven sprocket assembly, wherein the motor is bi-directionally coupled to the rear wheel, a manual pedal assembly supported by the frame comprising a pedal crank shaft with two pedals and a second driving sprocket coupled to a second driven sprocket assembly, where the pedal assembly is uni-directionally coupled to the rear wheel, a flexible motor drive member connecting the first drive sprocket to the first driven sprocket assembly coupled to the rear wheel and a flexible pedal drive member connecting the second driving sprocket to the second driven sprocket coupled to the rear wheel, where the location of the motor intersects or is tangent to the space defined by rotation of the pedal assembly and where the motor controller is electrically connected to the power supply, the throttle assembly and the motor.

In another aspect, a semi-flexible cable harness assembly for a power assisted vehicle is provided. The cable harness assembly includes a first cable harness housing attached to a fork of the vehicle, said housing pivoting with the fork, a second cable harness housing attached to the frame of the vehicle and a cable harness twisting member that connects the first cable harness housing to the second cable harness housing, said cable harness twisting member being substantially co-linear with the pivoting axis of the fork where pivoting of the fork rotates the first cable harness housing relative to the second cable harness housing.

In still another aspect, a motor mount assembly is provided. The motor mount assembly includes a center stand attached to a motor mount and an electric motor having a first motor drive sprocket wherein the electric motor is attached to the motor mount.

In still another aspect, a battery assembly is provided. The battery assembly includes battery bricks arranged in series and a housing equipped with cell taps and a high power connector where the bricks include cells arranged in parallel.

In still another aspect, a throttle assembly is provided. The throttle assembly includes a housing, a throttle cable housing supported by the housing, a plurality of signal wires attached to the housing, a pulley attached to a electromechanical transducer shaft and a throttle cable attached to the pulley.

In still another aspect, a battery quick release apparatus is provided. The quick release apparatus includes a battery saddle assembly and a lockable battery saddle quick release lever. The saddle assembly includes a battery saddle, a battery saddle retainer and an electrical connection.

BRIEF DESCRIPTION OF THE FIGURES

FIG. 11a illustrates a battery brick assembly exploded; and

FIG. 11b illustrates a section view of the battery assembly.

DETAILED DESCRIPTION

Figure 1:
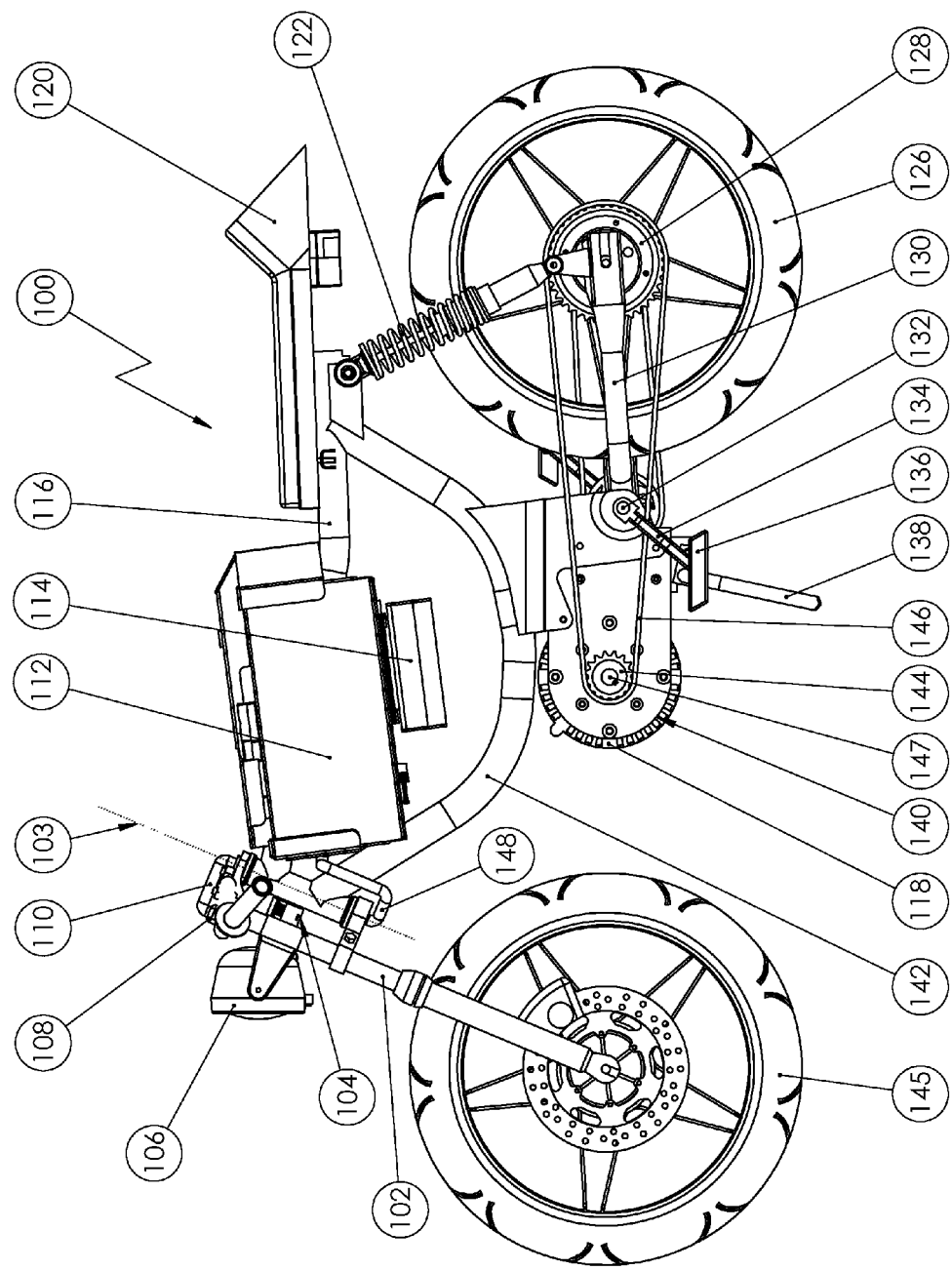
FIG. 1 illustrates a left view of the power assisted vehicle.
Figure 2:
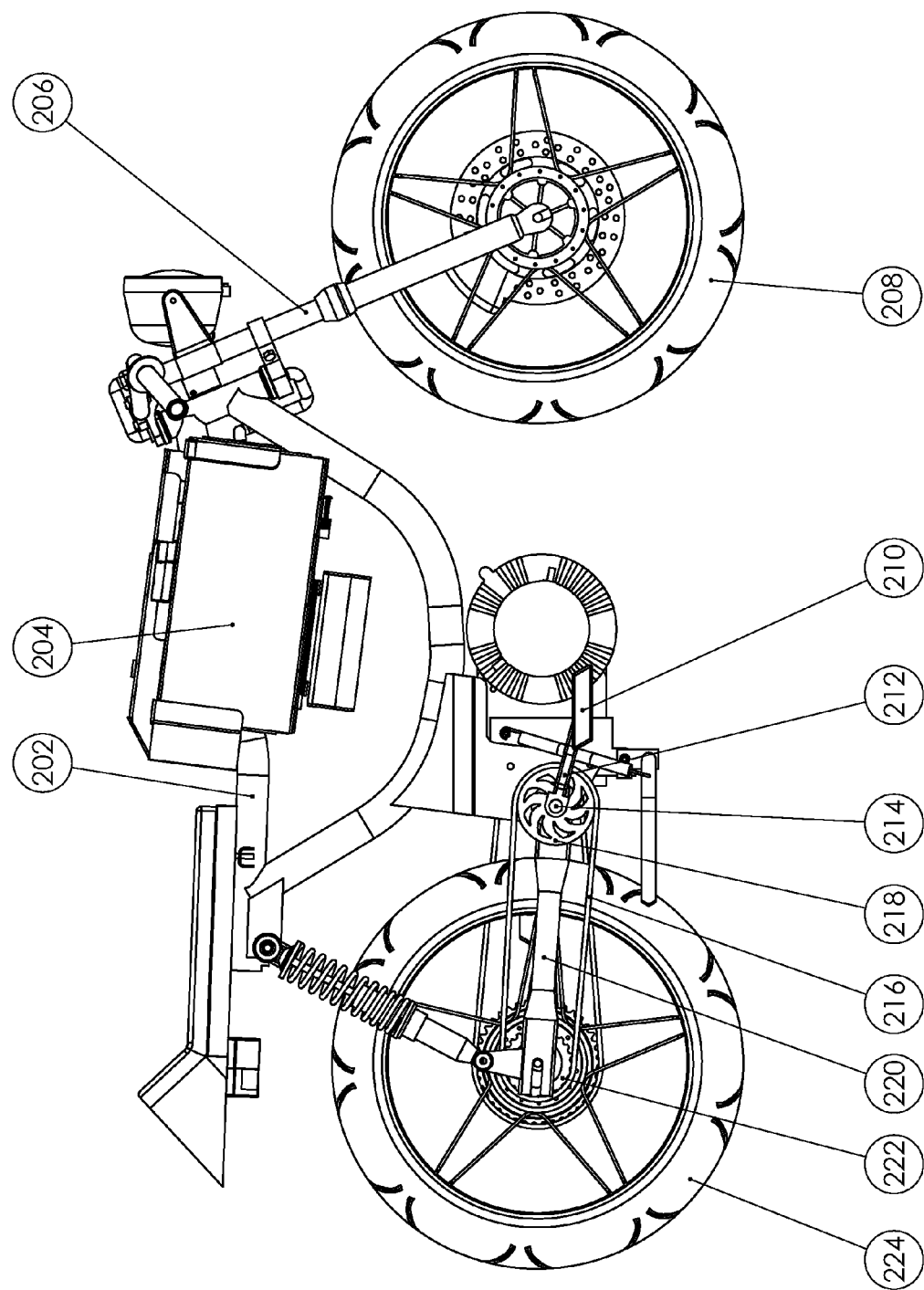
FIG. 2 illustrates a right view of the power assisted vehicle.
Figure 3:
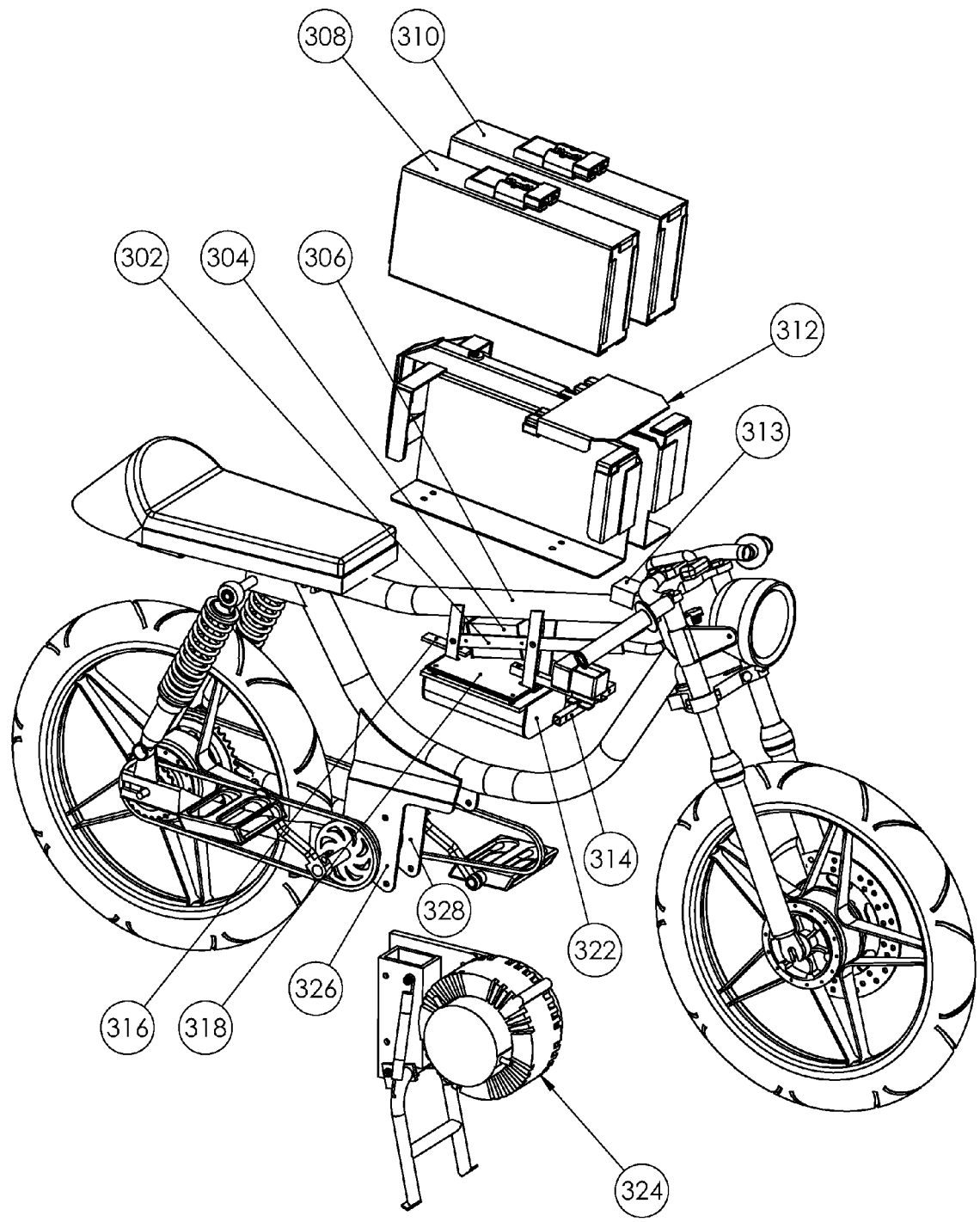
FIG. 3 illustrates a front right orthographic view with the battery assembly and the motor mount assembly exploded.
Figure 4:
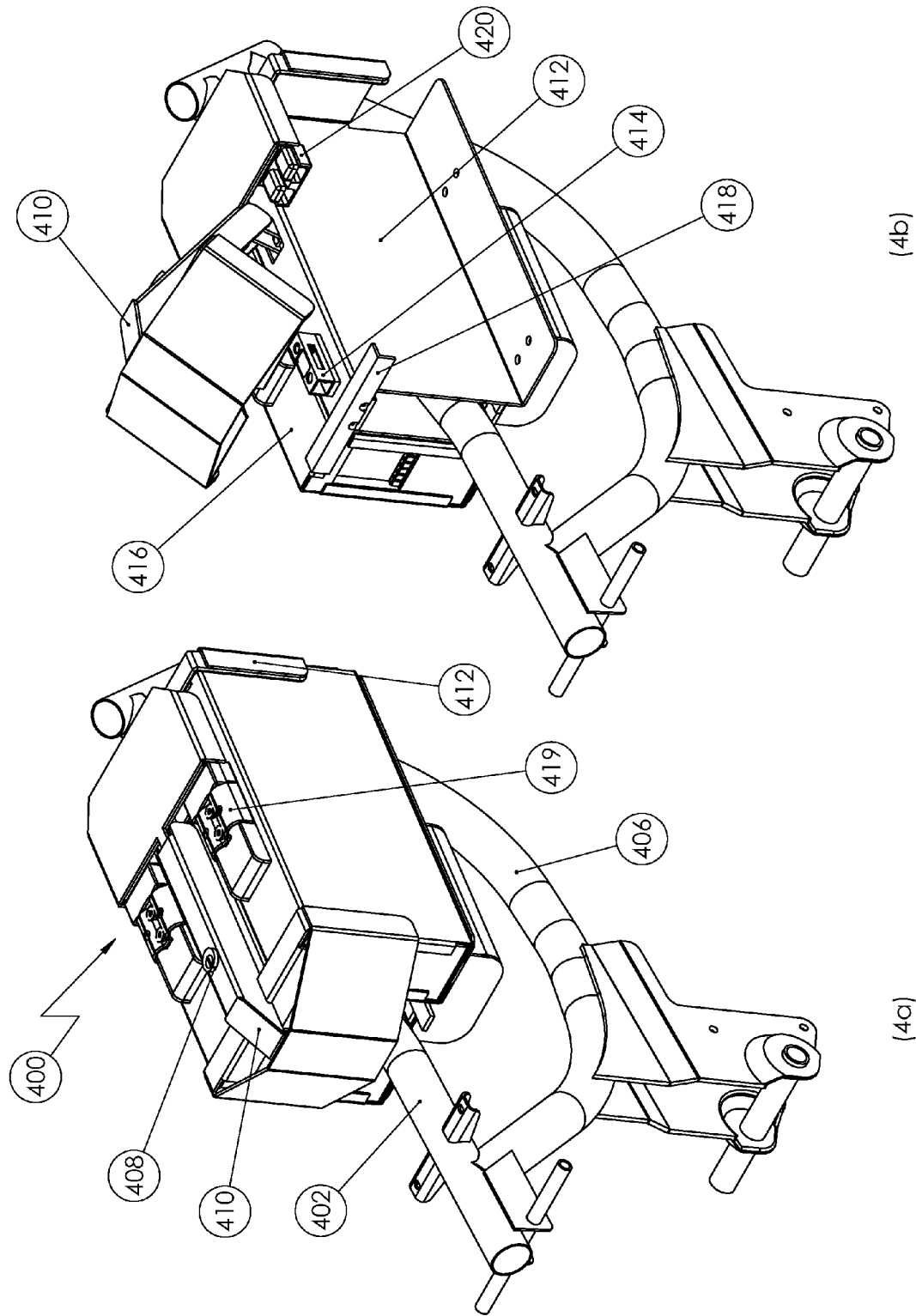
FIG. 4*a* illustrates a right orthographic view of the frame, the battery saddle assembly and the battery quick release apparatus with the battery quick release lever closed and locked.
FIG. 4*b* illustrates a right orthographic view of the frame, the battery saddle assembly and the battery quick release apparatus with the battery quick release lever open and unlocked with the right battery removed.

Provided herein is a power assisted motorized vehicle which can be operated in a manual mode or a motorized mode or in a combination of manual and motorized modes. The vehicle, inter alia, integrates pedal location with motor placement, has dynamic stability under operating conditions, provides substantial power output with simple, efficient battery charging and battery removal and may include several novel and useful assemblies. The features above are best illustrated by reference to the Figures disclosed herein. FIGS. 1-3 are directed towards some embodiments of the power assisted vehicle as a whole, while FIGS. 4-11 discuss novel assembles which are incorporated into some embodiments of the power assisted vehicle as depicted in FIGS. 1-3 but also are independently novel.

Typical petroleum driven cycles still must obey parking regulations that apply to automobiles. A power-assisted vehicle, such as, for example, the vehicle disclosed herein, meeting state and federal regulations, can legally be operated and parked in locales forbidden to cycles powered by gasoline. Accordingly, power assisted vehicles, such as those disclosed herein can be operated in bicycle lanes and legally parked on sidewalks, which is a significant advantage when compared to gasoline operated vehicles.

Referring now to FIG. 1, which illustrates a right view of some embodiments of the power assisted vehicle 100, an electromechanical throttle assembly 104 is connected to front fork 102 attached to front wheel 145. Light 106 is connected to front fork 102, as is upper cable harness housing 110 which couples to upper cable electronics 108. Upper cable harness 110 is connected to lower cable harness housing 148 through a cable harness twisting member (not illustrated in FIG. 1). Enclosing the cable wires in a housing avoids cable fatigue and routing problems which become increasingly important as the complexity of the electronics system increase. Left battery 112 is attached to cross bar 116 as is motor controller 114. Electric power is transferred from the battery to motor controller 114 and further to motor 118. The location of the battery, as one of the heavier components of the vehicle, is important to the stability of power assisted vehicle 100. Note that battery 112 is centrally located between both wheels and in front of the seat in this embodiment which balances vehicle 100 during operation. Also attached to crossbar 116 is seat 120 which is also supported by frame 142 and rear suspension 122 which is connected with rear wheel 126. Motor driven sprocket 128 is connected to rear wheel 126 which is also supported by rear fork 130. Rear fork 130 is coupled to frame 142 at the intersection of pedal crank shaft 132. Connected to pedal crank shaft 132 is left pedal crank 134 which is connected to left pedal 136. Center stand 138, which supports the power assisted vehicle in an upright position at rest, is attached to motor mount assembly 140 which is connected to frame 142. Motor mount assembly 140 also supports motor 118 having a motor driving sprocket 144. Motor power to drive the power assisted vehicle is transmitted by motor drive chain 146 from the motor driving sprocket 144 to the motor driven sprocket 128 attached to rear wheel 126. Note that the motor 118 is bidirectionally coupled to the rear wheel 126. The horizontal axis of the motor is defined by 147. Integration of the motor location with the disposition of the pedals allows for easy pedal clearance with respect to the motor. Further, location of the motor in an area defined by rotation of the pedals provides the power assisted vehicle with a low center of gravity, which is beneficial during operation of the vehicle. In addition, the location of the motor mount and thus the motor allows for high power electric motors to be used in the power assisted vehicles disclosed herein.

Referring now to FIG. 2, which illustrates a right view of an embodiment of the power assisted vehicle, right battery 204 is attached to cross bar 202 which is connected to right front fork 206 which supports front wheel 208. Right pedal 210 is attached to right pedal crank 212 which is connected to pedal crank shaft 214 coupled to the front pedal drive sprocket 218. Mechanical power is transmitted by pedal drive chain 216 which connects front pedal driving sprocket 218 to rear pedal driven sprocket 222. Rear pedal driven sprocket 222 is coaxially and unidirectionally attached to rear wheel 224 which is supported by rear fork 220. Accordingly, the pedals can remain stationary while wheel 224 rotates in the forward direction (e.g., when the vehicle is driven by the motor only) and can also be used to manually drive the power assisted vehicle (with or without motor assistance). Also, it should be apparent to the skilled artisan, that a foot support can replace the pedals to convert the power assisted vehicle to an entirely motorized vehicle.

FIG. 3 provides illustration of integration of the battery assembly and motor mount into the overall structure of some embodiments of the power assisted vehicle. Concentrating on the battery assembly, DC/DC converter support bracket 302 is attached to crossbar 306 and supports DC/DC converter 304. Right battery 308 and left battery 310 slide into battery saddle assembly 312. Battery saddle assembly 312 supports and restrains batteries 308 and 310 and provides electrical connection between the batteries and motor controller 322. Additional features related to the battery assembly illustrated in FIG. 3 include battery saddle assembly frame anchor 313, front battery saddle support guide 314, rear battery support upper guide 316 and center support guide 318.

An important feature of the battery saddle assembly used in some embodiments of the power assisted vehicle is a quick release functionality. The battery saddle assembly is shown in a closed state in FIG. 4a, and in an open state in FIG. 4b. Referring now to FIG. 4a, closed battery saddle assembly 400 is attached to crossbar 402 which is supported by frame 406. Note that in the closed state, batteries are enclosed by the battery saddle 412 and battery release lever 410. Key lock 408 when locked keeps battery release lever 410 in a closed state.

Referring now to FIG. 4b, left battery 416 is enclosed by battery saddle 412 while the right battery has been removed from battery saddle 412. When the battery saddle release lever 410 is in its open state, the battery can pivot outward and be easily removed from the battery saddle 412 of the power assisted vehicle. Key lock 408 (see FIG. 4a) is attached to lever 410 and can be selectively engaged to key lock receiver 414 (see FIG. 4b) which is attached to battery saddle 412.

As illustrated in FIG. 4b, battery saddle 412 in conjunction with battery saddle rear upper retainer 418 provides all but one degree of freedom of restraint required to secure the battery. The final degree of restraint is provided by battery saddle release lever 410, which prevents lateral movement of the rear of both right and left battery when closed. Electrical connection is formed between battery high power electric connector 419 (see FIG. 4a) and the fixed high power electric connector 420 (see FIG. 4b).

Figure 5A:
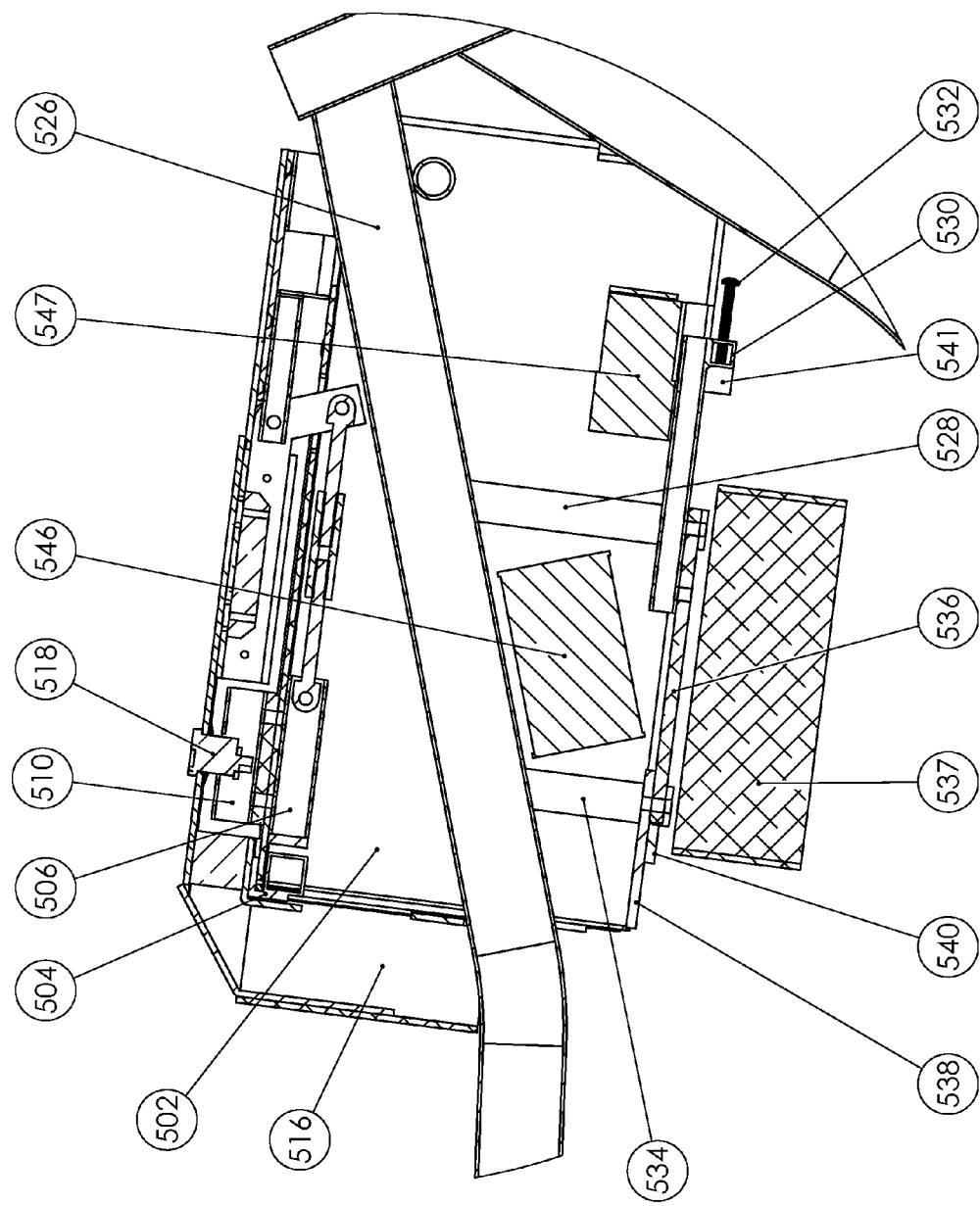
FIG. 5a illustrates a right side section view of the battery lever locked and closed.

Referring now to FIG. 5a, which illustrates a more detailed view of the battery assembly in a closed state, saddle 502 is vertically supported by center battery saddle support 536 which is coupled to crossbar 526 by battery supports 528 and 534. Front and rear battery support upper guides 530 and 538 are also rigidly coupled to center battery saddle support 536. Rear battery saddle lower guide 540 is coupled to saddle 502 such that saddle support upper guide 538 allows lower guide 540 to slide substantially forward and backward and prevent vertical motion of the rear of the saddle. Front battery saddle guide 541 is coupled to the underside of the front region of the saddle 502, and has a guide pin 532 extending forward and passing through a guide hole in the front battery saddle support guide 530. The front guide pins 532 prevent the front of the saddle from moving vertically and from spreading laterally. Front battery saddle guide 541 also supports ignition solenoid 547.

Also illustrated in FIG. 5a are battery saddle upper retainer 504, battery saddle tie rod anchor 506, key lock receiver 510 which is situated below key lock 518 and battery saddle release lever 516. DC/DC converter 546 is adjacent to motor controller 537.

Figure 5B:
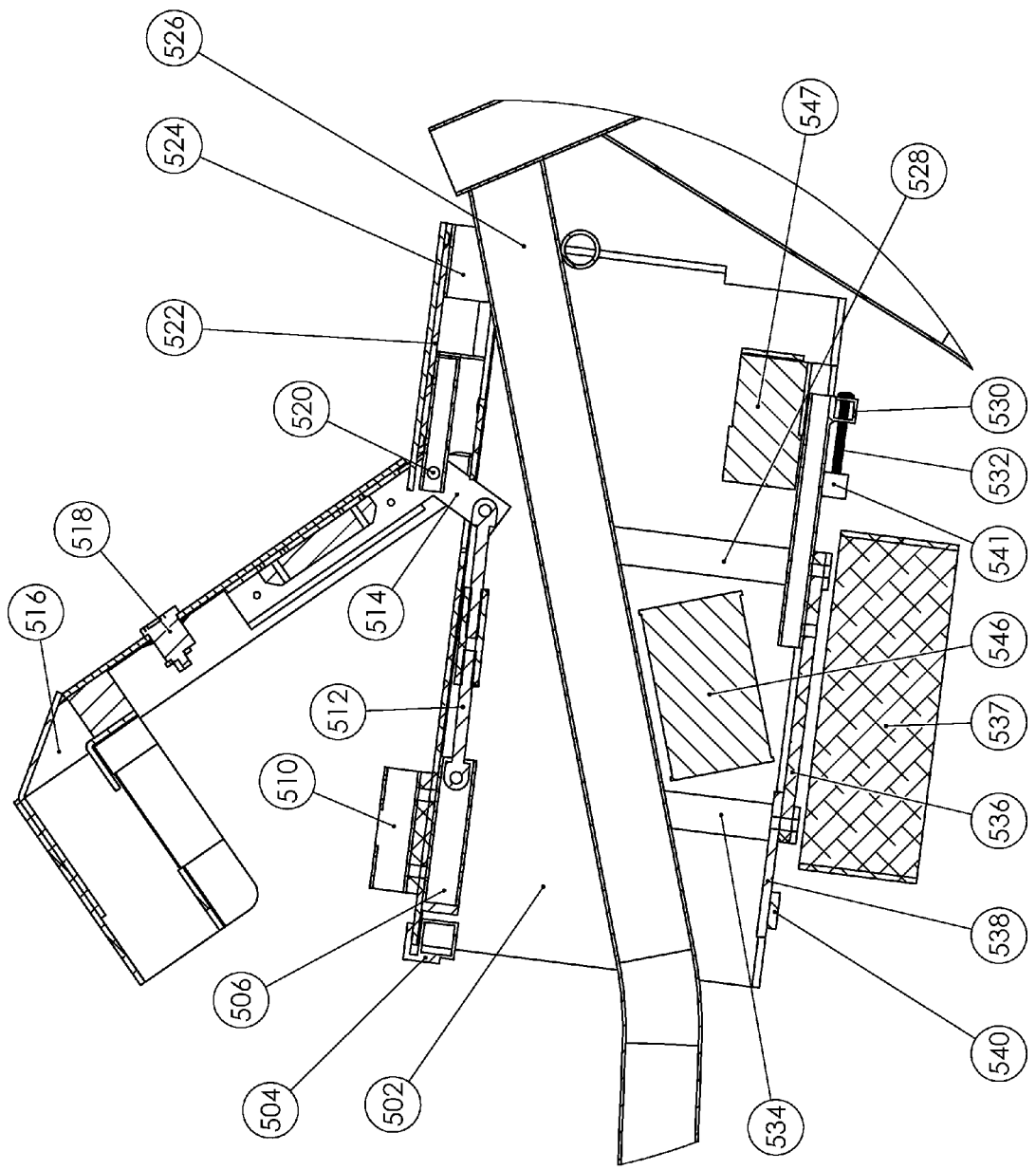
FIG. 5b illustrates a right side section view of the battery lever unlocked and open.
Figure 6:
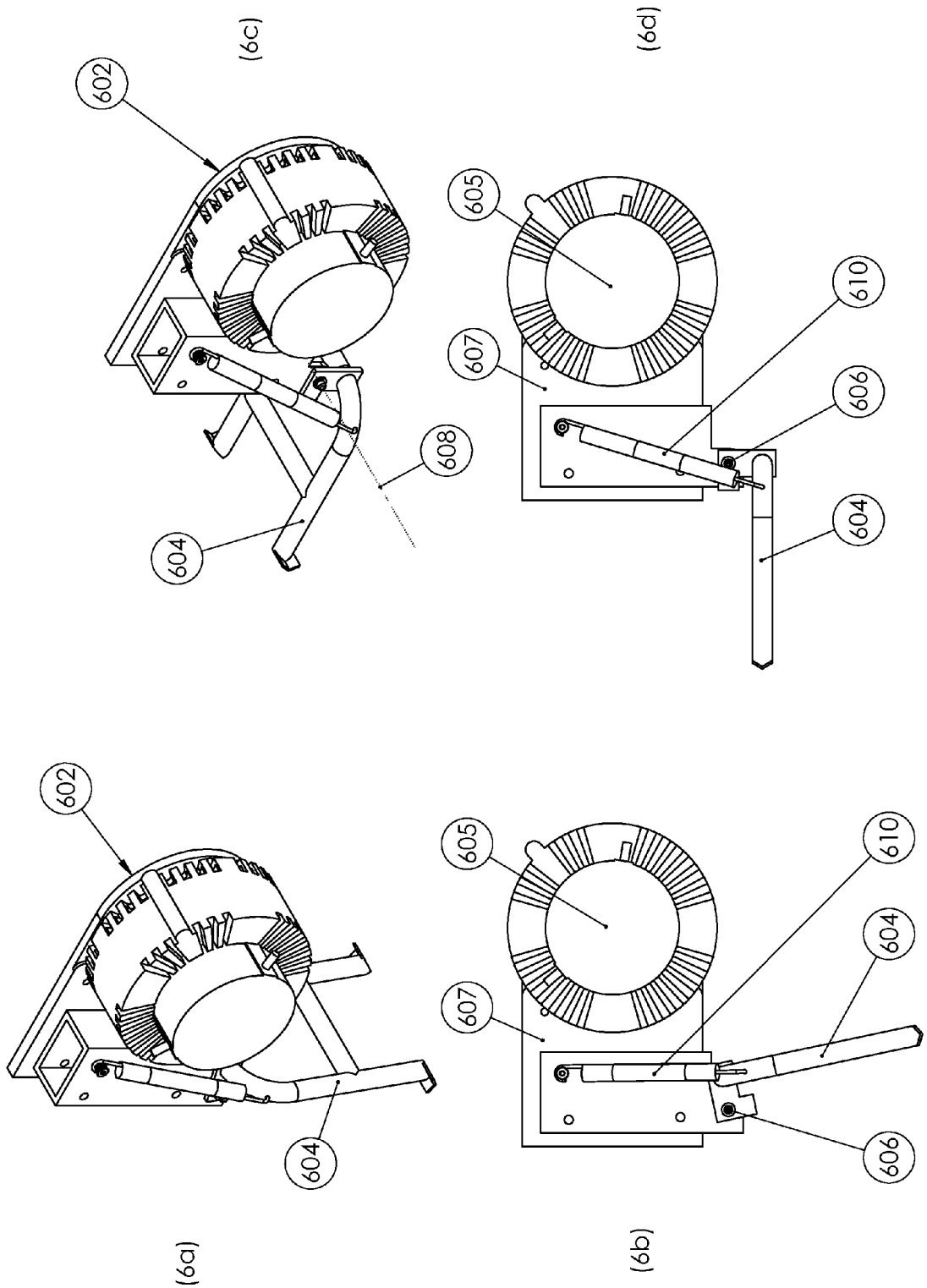
FIG. 6a illustrates an orthographic view of the motor mount assembly with the kickstand down.
FIG. 6b illustrates a right side view of the motor mount assembly with the kickstand down.
FIG. 6c illustrates an orthographic view of the motor mount assembly with the kickstand up.
FIG. 6d illustrates a right side view of the motor mount assembly with the kickstand up.

In FIG. 5b, battery saddle lever 514 pivots about axis 520 of battery saddle lever pivot anchor 522 which is fixedly coupled to the crossbar 526 through frame anchor 524. As the battery saddle release lever 516 is opened, battery saddle lever 514 pushes the adjustable-length battery saddle tie rod 512 pivotably coupled to tie rod anchor 506 which is fixedly coupled to battery saddle 502. Battery saddle release lever 516 also provides mechanical advantage to battery saddle lever 514 to overcome the high forces required to disconnect the battery high power electric connector 419 (see FIG. 4a) from the fixed high power electric connector 420 (see FIG. 4b).

When battery saddle release lever 516 is lifted, saddle 502 is pushed rearward and moves the batteries with it and away from the fixed high power electrical connectors 420 (see FIG. 4b) thus electrically and mechanically disconnecting the batteries from the power assisted vehicle. With the battery saddle release lever in the open state, lateral restraint of the rear of the batteries is lost allowing the batteries to be pivoted outward and removed from the power assisted vehicle. The quick release functionality allows for ready removal of batteries for charging, theft prevention and monitoring of battery status, when the power assisted vehicle is at rest.

Another element of interest in some embodiments of the power assisted vehicle is the motor mount assembly. As illustrated in FIG. 1, motor mount assembly 140 couples motor 118 to frame 142 and provides support for vehicle center stand 138. As shown in FIG. 3, motor mount assembly 324 is connected via left and right gussets 328 and 326 to the frame. FIG. 6a illustrates a perspective view of motor mount assembly 602 with the center stand 604 in the "down" position, while FIG. 6c illustrates a similar view with center stand 604 in the "up" position. As shown in FIG. 6b, center stand 604 pivots about center stand pivot axis pin 606 which defines pivot axis 608 (see FIG. 6c). Center stand 604 is sprung into either of two stable positions by center standspring 610 by incorporating an over-center geometry such that when the center stand 604 is in the "down" position as illustrated by FIG. 6a, center stand spring 610 applies a force in front of the pivot axis 608 further biasing the "down" position. When the center stand 604 is in the "up" position as illustrated by FIG. 6d, center stand spring 610 applies a force behind the pivot axis 608 further biasing the up position. The above provides the center stand with unusual stability in either up and down positions.

Typical gasoline-powered cycles often integrate a center stand into the engine housing. The motor mount assembly and battery saddle assembly illustrated in the Figures above can also be used as a drop-in replacement or as a kit to convert gasoline-burning motor-assisted cycles into electric motor-assisted cycles. The specific mount geometry of the present motor mount assembly, in some embodiments, is compatible with many popular gasoline-burning mopeds.

The motor mount assembly provided herein integrates the motor with the center stand. The center stand, because of the features described above is unusually stable and allows, for example, pedaling to recharge the battery while the power assisted vehicle is stationary. Some popular electric motor-assisted cycles risk leaving the user stranded if the batteries become depleted. However the power assisted vehicle disclosed herein with the center stand structure described herein and the proper weight distribution from the battery and motor locations disclosed herein may be manually charged while the cycle is stationary. Accordingly, the user may exercise while recharging the batteries of the power assisted vehicle through pedaling.

Some embodiments of the power assisted vehicle include a protective cable housing. Electrically powered vehicles have substantially more electrical wiring when compared to gasoline or manually powered cycles. Accordingly, properly routing wiring and protecting wiring from external damage and fatigue are particularly significant in an electrically powered vehicle.

Electronic components such as headlights, instrument panels and electromechanical controls such as throttle and brake are often mounted on steering assemblies that pivot with respect to frames supporting their electric power supplies and master control units. Referring to FIG. 1, front fork steering assembly 102 which is supported by frame 142 and crossbar 116 pivots about steering assembly pivot axis 103. Upper cable harness electronics 108 are connected to semi-rigid upper cable harness housing 110 that is anchored to and moves with front fork steering assembly 102.

Figure 7:
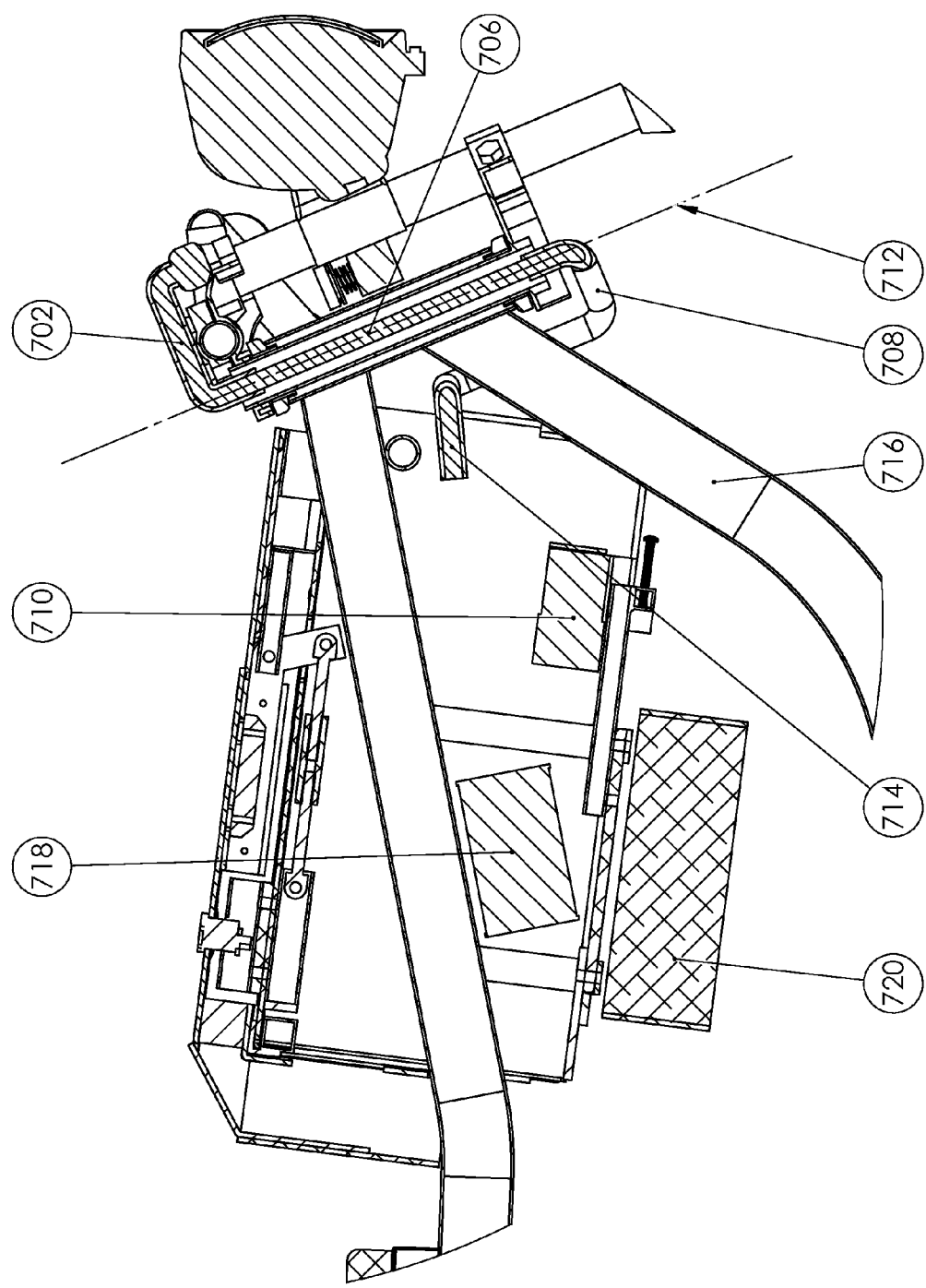
FIG. 7 illustrates the upper cable housing in detail.

Referring now to FIG. 7, semi-rigid lower cable harness 708 is fixedly coupled to frame 716 such that when the steering assembly is rotated, housing 702 rotates with respect to housing 708. Cable harness twisting member 706 connects upper cable harness housing 702 to semi-rigid lower cable harness housing 708, and passes substantially coaxially to axis 712. Lower cable harness wires 714 exit the lower cable harness housing 708 and connect to fixed electric components such as the DC/DC converter 718, motor controller 720, and ignition solenoid 710.

Traditional mechanical twist grip throttles such as on motorcycles function by wrapping a cable around a pulley connected to a hand grip. Twisting the hand grip pulls a central cable through a cable housing. The relative motion of the cable through the cable housing is received by components such as, for example, the carburetor of a gasoline-powered motorcycle.

Throttle assemblies for electric vehicles typically have three electrical wires extending from the housing that connect to a motor control unit. These transducers convert mechanical input from the user in such forms as thumb motion, twisting of a hand grip, or pressing a foot pedal into electrical signal. Often the user experience of such twist grips is inferior to traditional mechanical twist grips.

Figure 8:
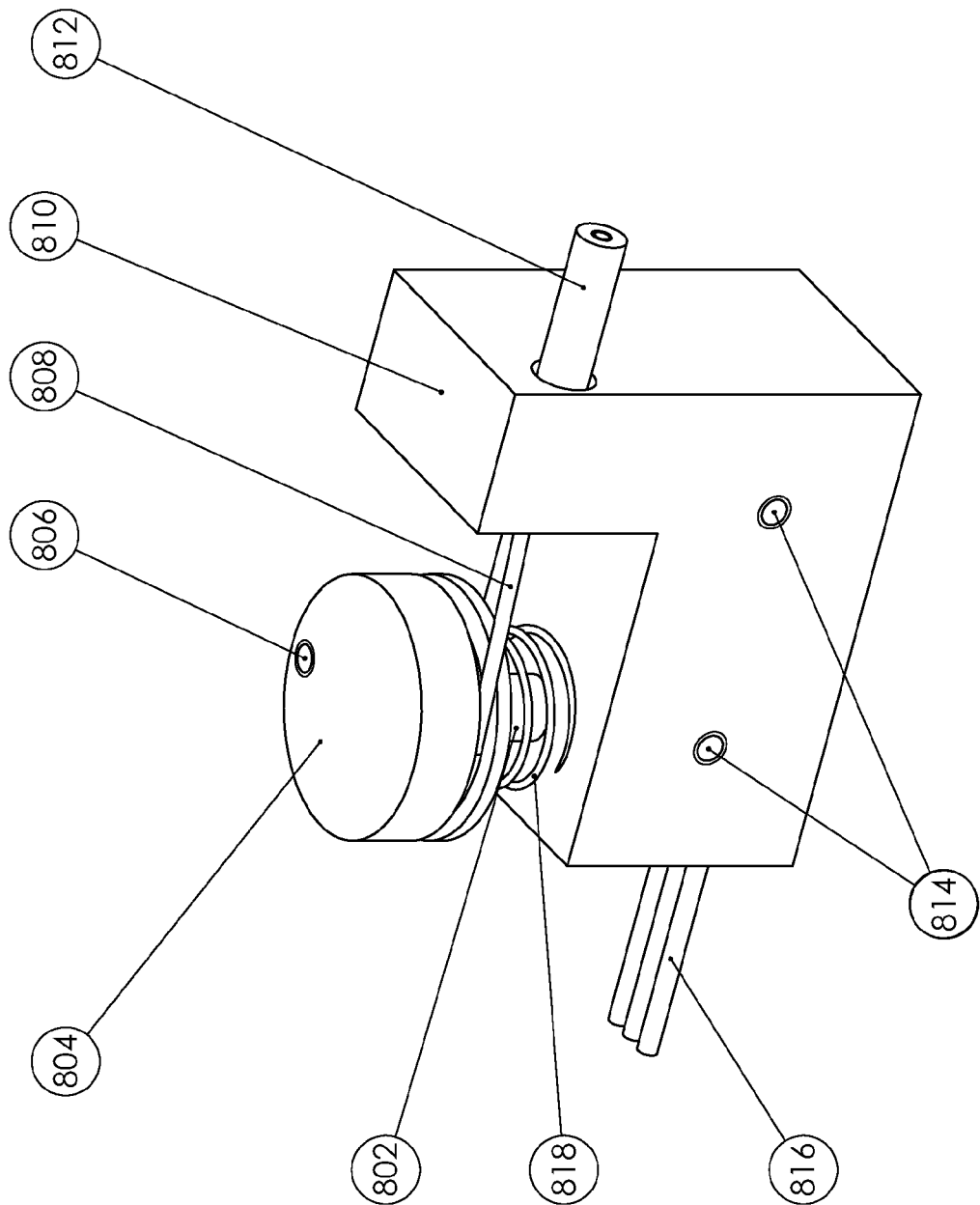
FIG. 8 illustrates an electromechanical throttle assembly, which typically is mounted on a steering assembly and converts mechanical cable motion into an electrical signal read by the motor controller.

In some embodiments, an electromechanical throttle interface assembly 104 is mounted to the front fork steering assembly 102 as shown in FIG. 1. FIG. 8 illustrates a electromechanical throttle interface assembly, which may be used in some embodiments of the power assisted vehicle, in greater detail. The assembly includes a housing 810 having mounting holes 814 and an electromechanical transducer such as a potentiometer or hall-effect sensor with typically three signal wires 816. In some embodiments, a pulley 804 is attached to the end of a transducer shaft 802 which is torsionally biased by spring 818. Electromechanical throttle interface housing 810 supports one end of throttle cable housing 812 and allows throttle cable 808 to pass through. Cable 808 wraps around and is anchored to pulley 804 with set screw 806. In some embodiments, anchoring mechanisms may include molded cable features coupling to mating features in the pulley. The three signal wires 816, in some embodiments, are included in the bundle of a cable harness twisting member (i.e., 706 in FIG. 7).

A traditional problem with electrically powered vehicles has been the required use of heavy and environmentally detrimental lead acid batteries as a source of electric power. The introduction of lithium ion batteries dramatically decreased battery weight and increased performance and reliability of most electric vehicles. However, lithium batteries require more complex and consistent cell monitoring for peak performance, efficiency and reliability.

Motorized cycles have become increasingly popular in urban settings as a mode of transportation, but the detrimental environmental impact of gasoline-burning vehicles, has led to increasing recognition of the need for environmentally-friendly vehicles. The disconnect between the energy available in battery-powered vehicles versus that of gasoline-powered vehicles and the toxicity and inefficiency of traditional lead acid batteries reduced demand for electric vehicles. The power assisted vehicles disclosed herein leverages environmentally safe lithium batteries packaged in an energy-efficient vehicle and can resolve many of the issues associated with electric vehicles.

A combination of high direct current voltage and current carrying capacity of the battery is needed to provide the electric power required by the power assisted vehicle described herein. The present battery assembly shown in FIGS. 9-11 includes five battery bricks arranged in series, each brick comprising sixteen cells arranged in parallel in a nested pattern for space saving and structural purposes.

Figure 9:
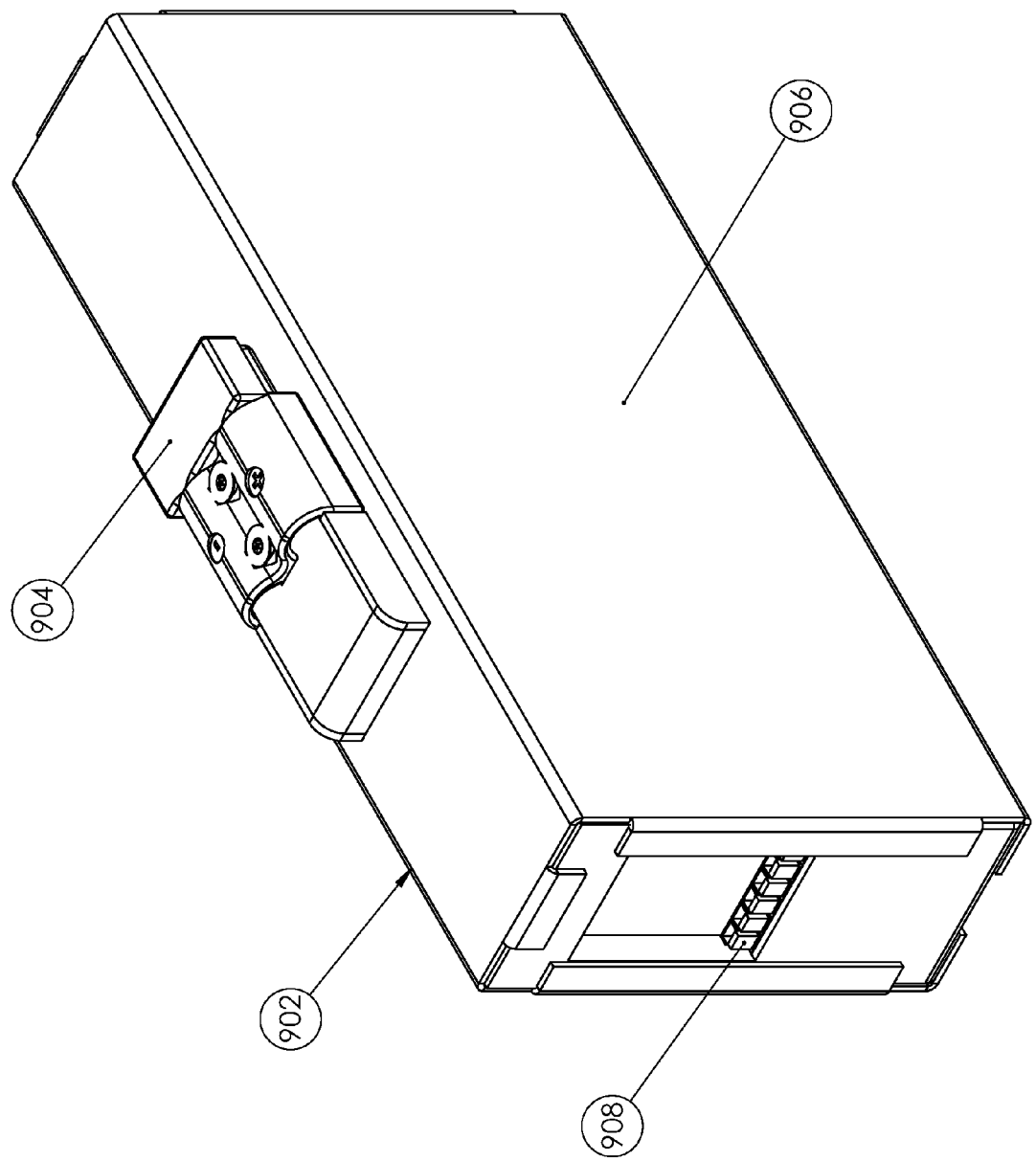
FIG. 9 illustrates a battery assembly.

Referring now to FIG. 9, high power is transmitted out of the battery 902 which is enclosed in battery enclosure housing 906 through battery high power electric connector 904. The health of each parallel battery brick is monitored by battery cell taps 908 located on one end of battery 902.

Figure 10:
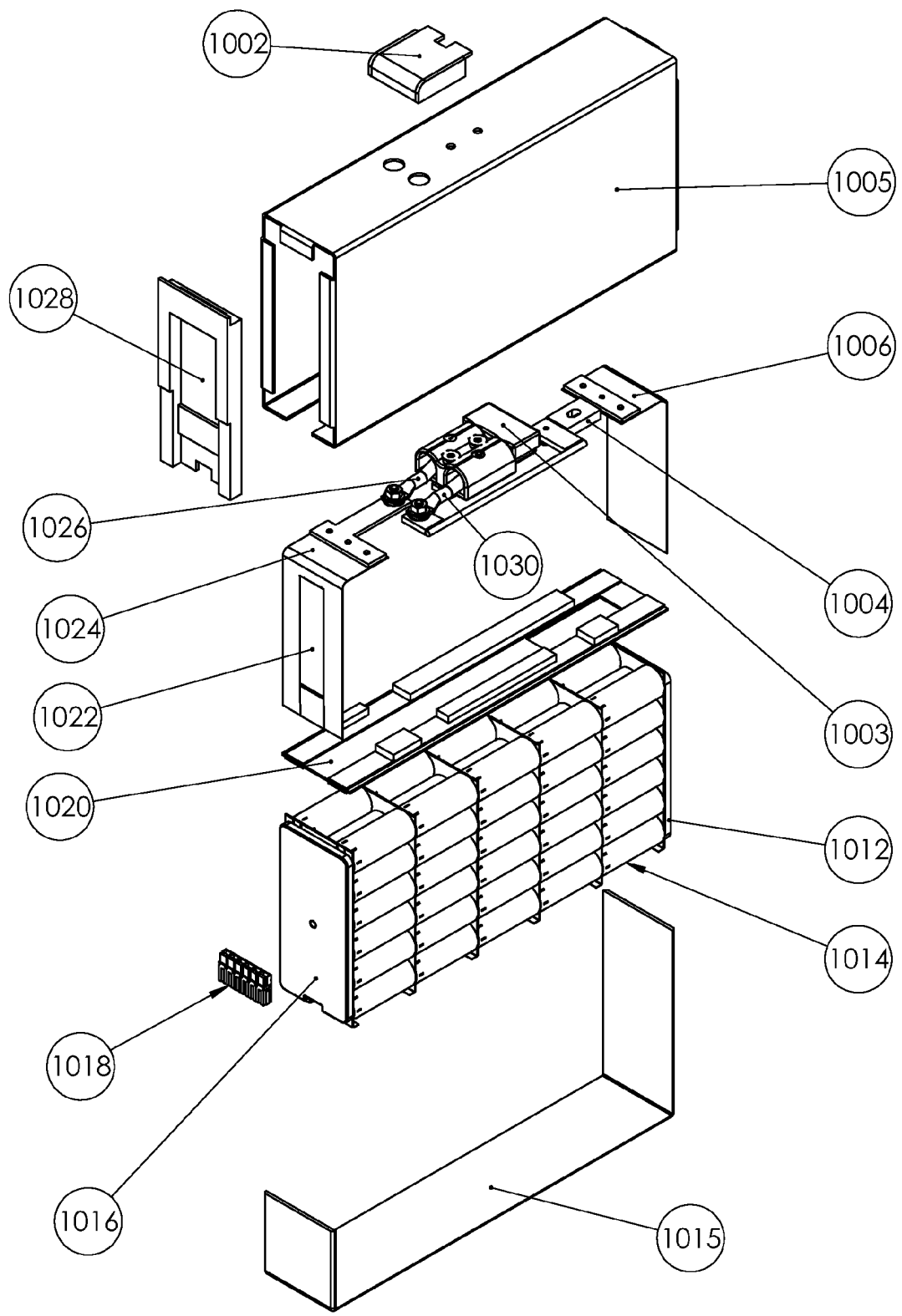
FIG. 10 illustrates an exploded orthographic view of the battery assembly.

Referring now to FIG. 10, the negative pole of battery brick 1014 is represented by terminal plate 1016. The negative terminal contact 1024 electrically connects negative terminal plate 1016 to the negative pole of battery high power electric connector 1003 through high power connector negative wire 1026. Once assembled, contact 1024 is pressed against the negative terminal plate 1016 by compressing battery terminal contact spring 1022 against the inner wall of battery enclosure end plate 1028.

The positive pole of battery brick 1014 is represented in FIG. 10 by terminal plate 1012. The positive terminal contact 1006 electrically connects terminal plate 1012 to the battery fuse 1004. Direct current passes from fuse 1004 to the positive pole of battery high power electric connector 1003 through high power connector positive wire 1030. A battery high power connector wire cover 1002 protects the user from exposed live wires. The battery brick assembly 1014 is insulated from exposed electronics above by insulator plate 1020.

Access to each battery brick assembly voltage is provided by battery cell tap assembly 1018 allowing monitoring of the condition of each bank of cells. Once assembled, battery cell tap assembly 1018 is supported between the inner surface of the short length of battery enclosure bottom 1015 and the outer surface of battery enclosure end plate 1028. Battery enclosure housing 1005 protects and provides structural support for internal battery electronics.

FIG. 11 illustrates an exploded view of battery brick assembly 1112 in an orthographic projection (a) and in a section view (b). Battery brick terminal plates 1102, 1116 form the negative and positive poles, respectively, of battery brick assembly 1112. In some embodiments, cylindrical battery cells 1108 are arranged in parallel in a space-saving lattice to form high-current, low-voltage parallel battery bricks 1106. Bricks 1106 are arranged in series to form a high-current, high voltage battery brick assembly 1112.

Battery port contact spring plates 1104 are compressed between neighboring bricks 1106. Plates 1104 ensure electrical contact between cells 1108 of neighboring bricks 1106 and provide external access to monitor the voltage across each brick 1106 in brick assembly 1112 as required to optimally harness stored battery pack energy.

The rigidity of battery brick terminal plates 1102, 1116 allows for a uniform compressive force to be applied to the ends of brick assembly 1112. A single insulated battery tie rod 1110 passes through the center region of brick assembly 1112 and attaches to negative terminal plate 1102. Insulated tie rod nut 1114 mechanically couples battery brick terminal plate screw 1118 to tie rod 1110 and electrically isolates positive terminal plate 1116 from negative terminal plate 1102.

FIG. 11b shows a section view of battery brick 1112 in the exploded view of FIG. 11a. Battery tie rod 1110 is shown passing through the center region of both the battery bricks 1106 and spring plates 1104. To remain within the physical boundaries of the battery brick assembly 1112, the leftmost (most negative) spring plate 1104 is oriented in the opposite direction from the other spring plates 1104. FIG. 11b further illustrates an assembly order of components that comprise battery brick 1112. The use of standard connectors for both high power transmission and low power cell monitoring allows the battery to be configured in series and in parallel and monitored with many standard off-the-shelf battery management systems.

Finally, it should be noted that there are alternative ways of implementing the present invention. Accordingly, the present embodiments are to be considered as illustrative and not restrictive, and the invention is not to be limited to the details given herein, but may be modified within the scope and equivalents of the appended claims.

What is claimed is:

1. A power assisted vehicle comprising:
   a frame connected to a front fork supporting a front wheel and a rear fork supporting a rear wheel, the rear wheel having a first driven sprocket assembly and a second driven sprocket assembly;
   a rechargeable electrical power supply attached to the frame;
   a motor controller attached to the frame;
   an electric motor supported by the frame and attached to a first driving sprocket which is coupled to the first driven sprocket assembly on the rear wheel;
   a motor drive member directly connecting the first driving sprocket and the first driven sprocket assembly on the rear wheel;
   a manual pedal assembly supported by the frame and comprising a pedal crank shaft with two pedals and a second driving sprocket which is coupled to the second driven sprocket assembly on the rear wheel; and
   a pedal drive member directly connecting the second driving sprocket and the second driven sprocket on the rear wheel;
   wherein the center of mass of the motor is forward of the pedal crank shaft;
   wherein the motor is bi-directionally coupled to the rear wheel, and the pedal assembly is uni-directionally coupled to the rear wheel;
   wherein the location of the electric motor intersects or is tangent to the area defined by rotation of the pedal assembly; and
   wherein the power supply is electrically connected to the motor controller.

2. The vehicle of claim 1, wherein the frame is substantially curved.

3. The vehicle of claim 1 further comprising a seat supported by the frame.

4. The vehicle of claim 1 further comprising a center stand attached to the frame.

5. The vehicle of claim 1, wherein the electric motor and a center stand are attached to a motor mount which is supported by the frame.

6. The vehicle of claim 1, wherein the power supply is at least one battery.

7. The vehicle of claim 6, wherein the battery is a lithium ion battery.

8. The vehicle of claim 7, wherein the battery comprises:
   a housing with at least one cell tap and at least one electrical connector; and
   battery bricks arranged in series within the housing;
   wherein the bricks comprise cells arranged in parallel.

9. The vehicle of claim 1, wherein the vehicle is motorized cycle.

10. The vehicle of claim 1, wherein the vehicle is a manually assisted moped.

11. The vehicle of claim 1, further comprising a headlight attached to the front fork.

12. The vehicle of claim 1, further comprising:
    a first cable harness housing attached to the front fork, said cable harness housing pivoting with the front fork;
    cable harness electronics attached to the first cable harness housing;
    a second cable harness housing attached to the frame; and
    a cable harness twisting member that connects the first cable harness housing with the second cable harness housing, said cable harness twisting member being substantially co-linear with the pivoting axis of the front fork;
    wherein pivoting of the front fork rotates the first cable harness housing relative to the second cable harness housing.

13. The vehicle of claim 1, further comprising a throttle assembly comprising:
    a first housing attached to the frame;
    a throttle cable housing supported by the first housing;
    a plurality of signal wires attached to the first housing;
    an electromechanical transducer attached to the first housing comprising a transducer shaft; and a pulley attached to the transducer shaft; and
    a throttle cable attached to the pulley;
    wherein the signal wires are electrically connected to the motor controller.

14. The vehicle of claim 1, further comprising
    a battery saddle assembly attached to the frame comprising a battery saddle slidably coupled to a fixed frame; and
    a battery retainer;
    an electrical connection coupled to the frame; and
    an unbiased and lockable battery saddle actuation lever.

15. The vehicle of claim 14, wherein the battery retainer further comprises a first battery retainer interfacing with the front of a battery and a second battery retainer interfacing with the rear of a battery.

16. The vehicle of claim 15, wherein the first battery retainer is coupled to the front of the battery saddle.

17. The vehicle of claim 15, wherein the second battery retainer is coupled to the rear of the saddle.

18. The vehicle of claim 14, wherein a linkage couples the actuation lever to the battery saddle.

19. The vehicle of claim 14, wherein the battery saddle receives a plurality of batteries.

* * * * *